April 17, 1934.  S. R. HOWARD ET AL  1,955,331
WRAPPING MACHINE
Filed Sept. 20, 1929  11 Sheets-Sheet 4
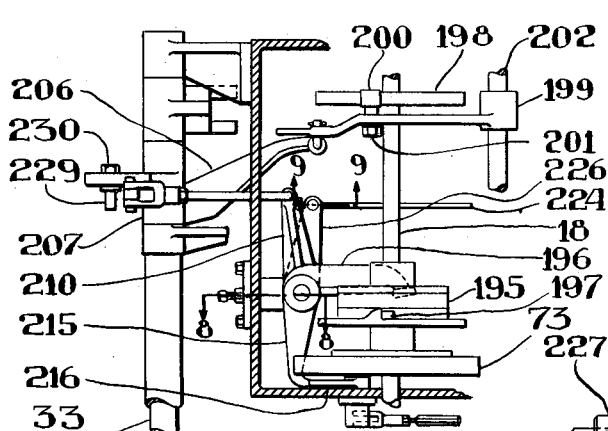
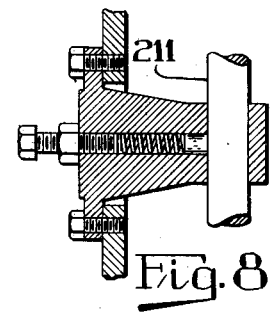
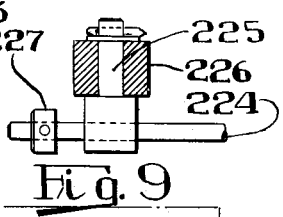
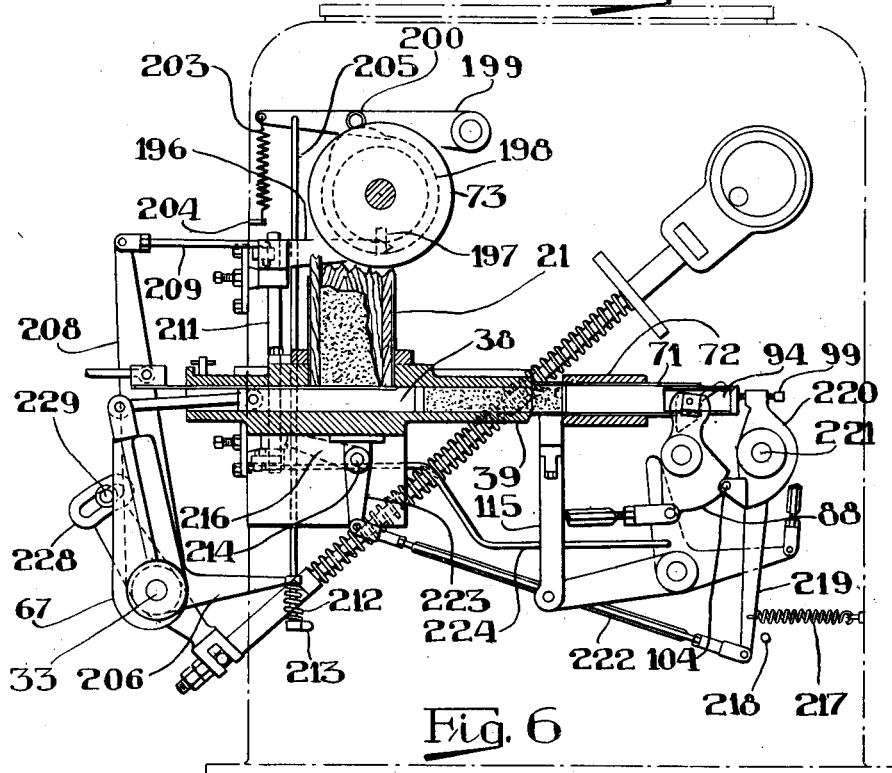
INVENTORS
Stanley R. Howard
BY Arthur C. Everett
J. Stanley Churchill
ATTORNEY April 17, 1934. S. R. HOWARD ET AL 1,955,331
WRAPPING MACHINE
Filed Sept. 20, 1929 11 Sheets-Sheet 5
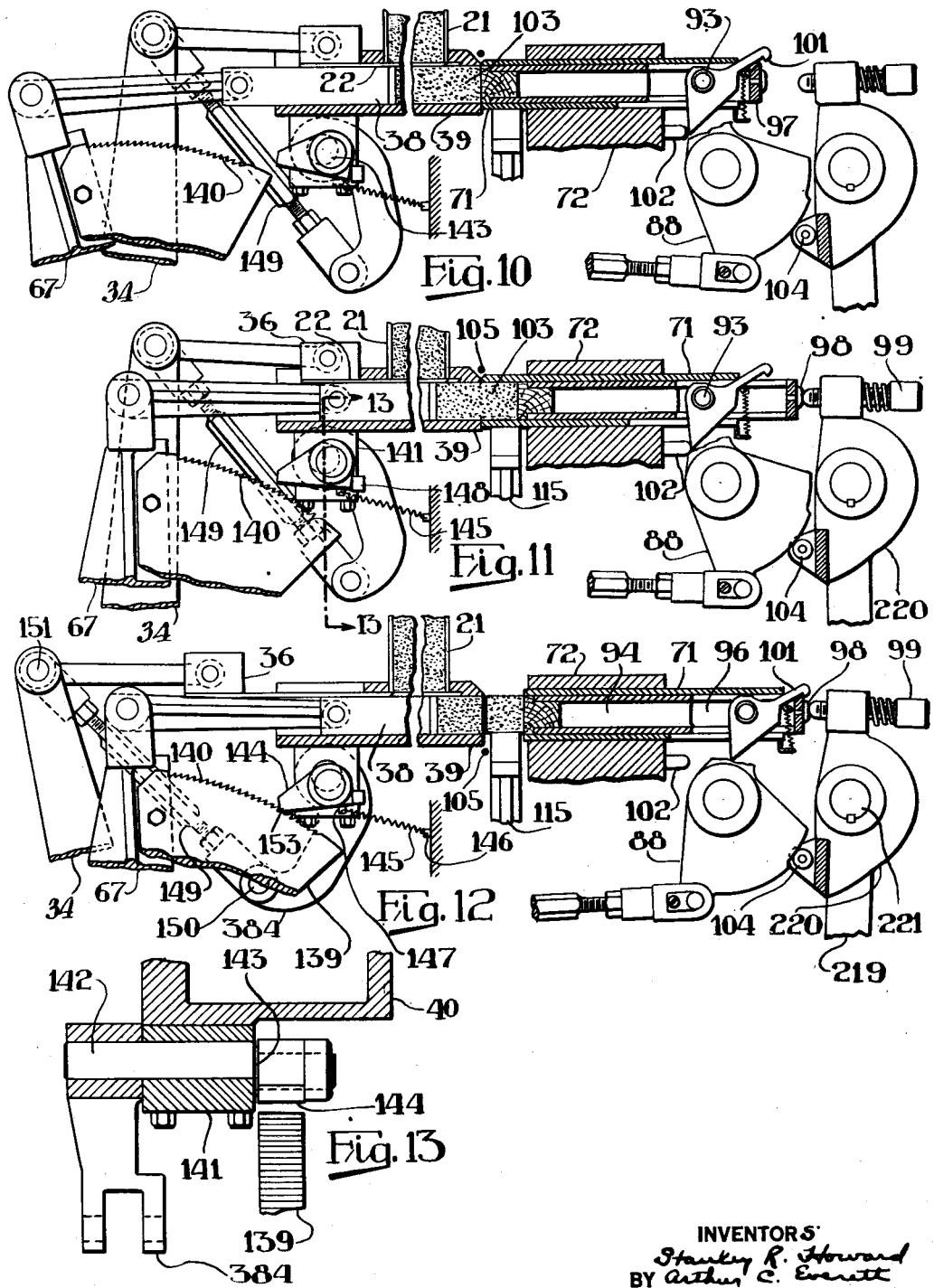

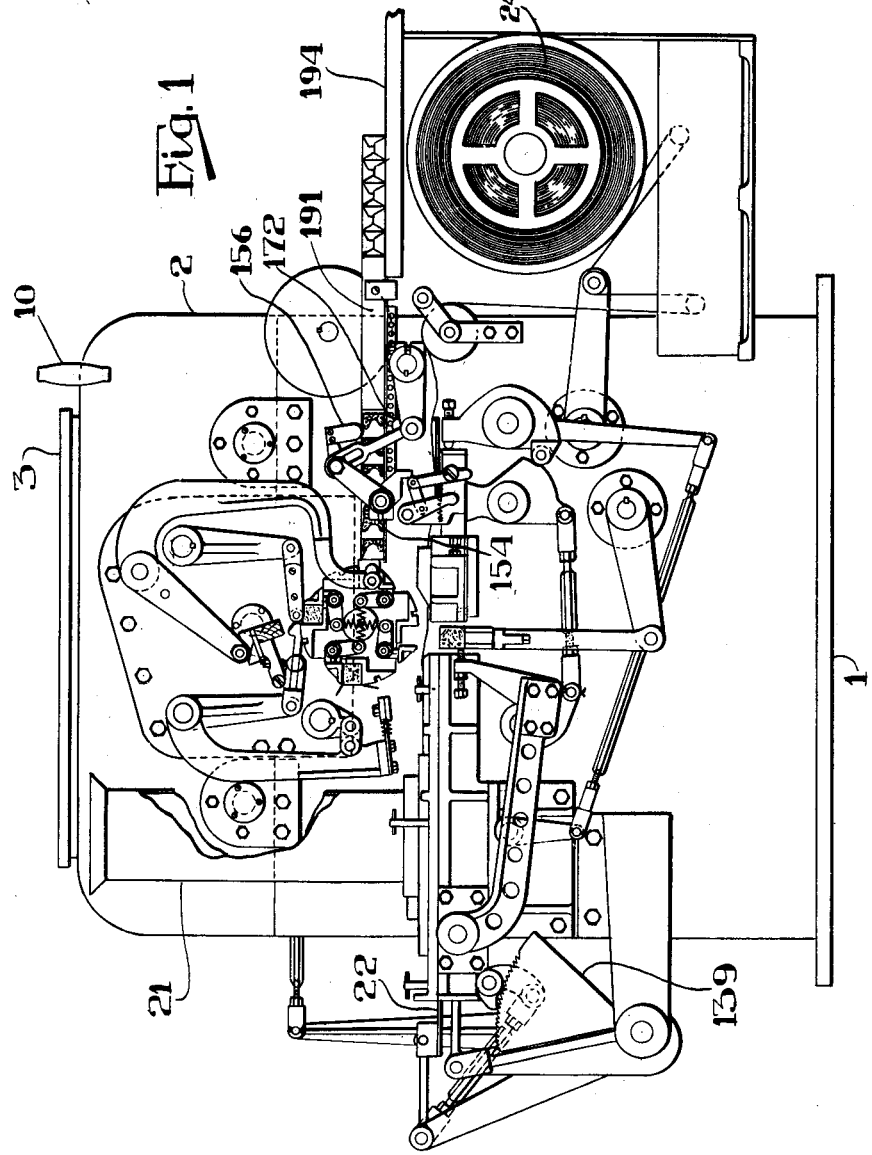

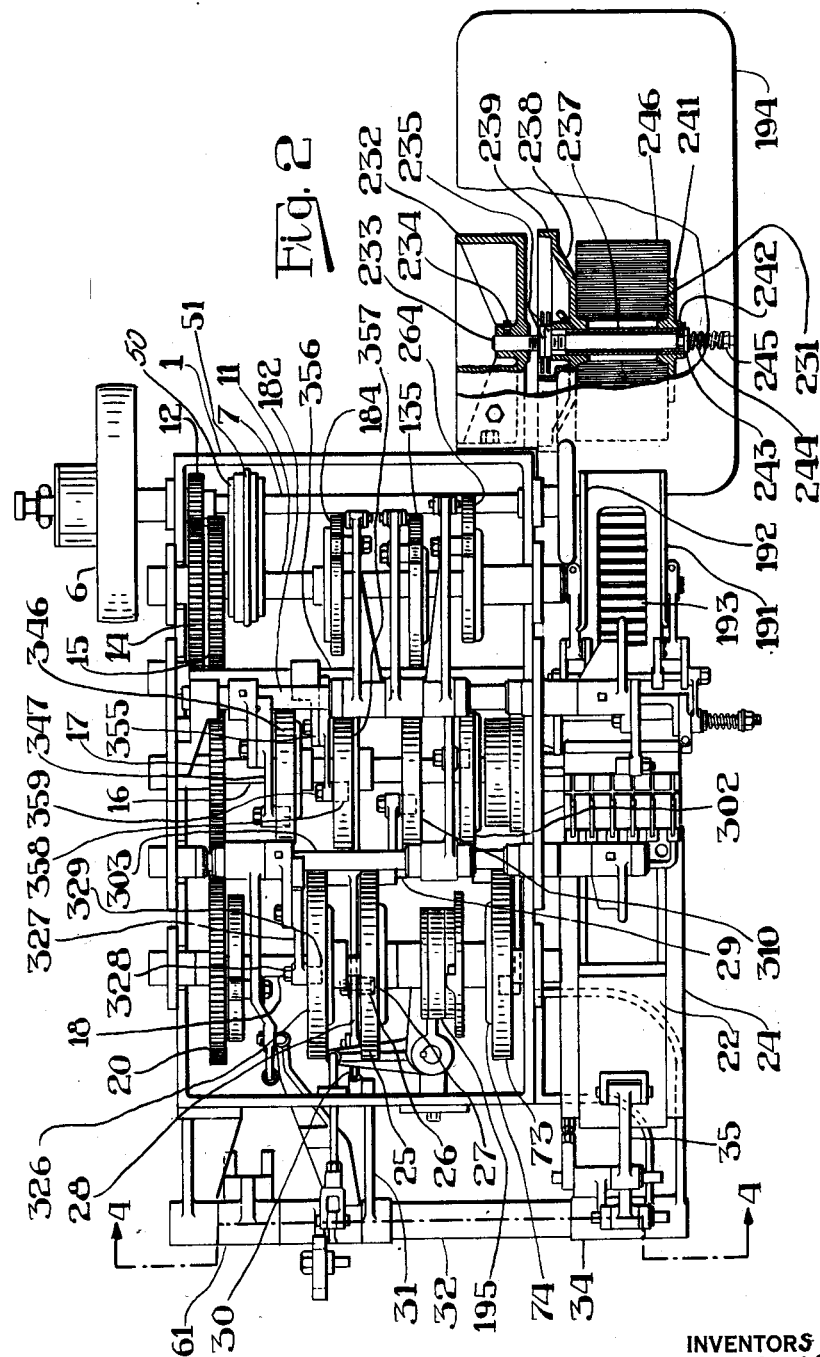

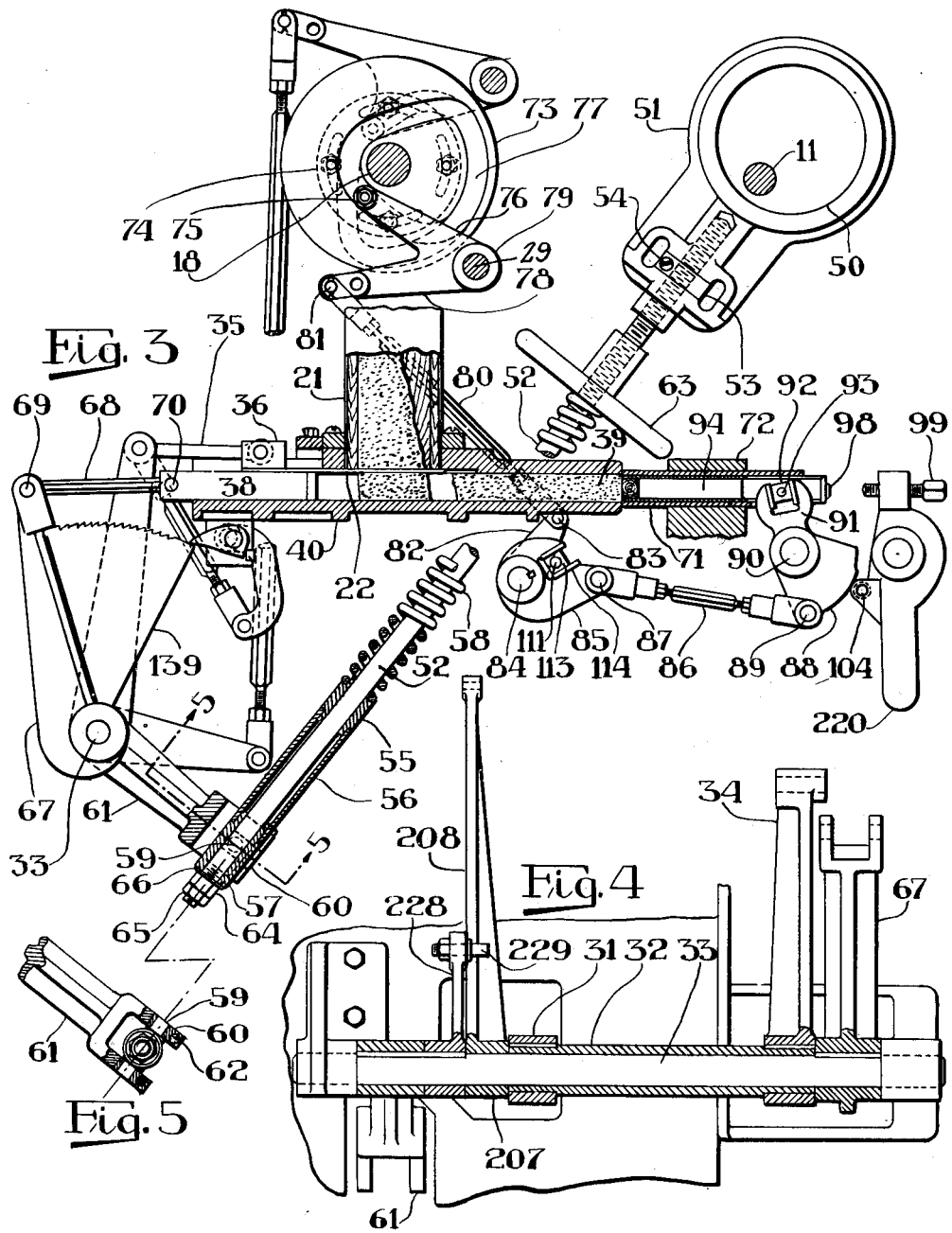

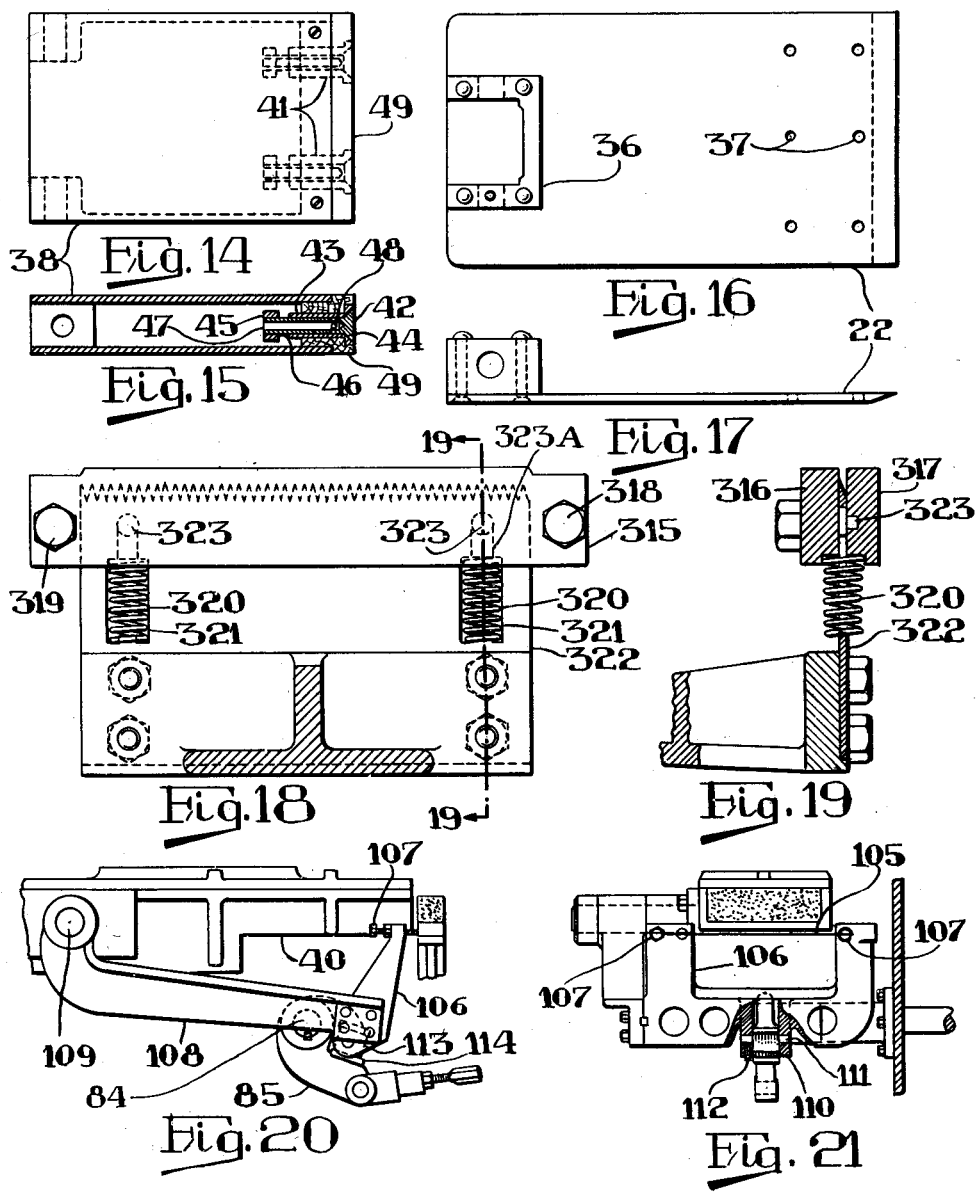

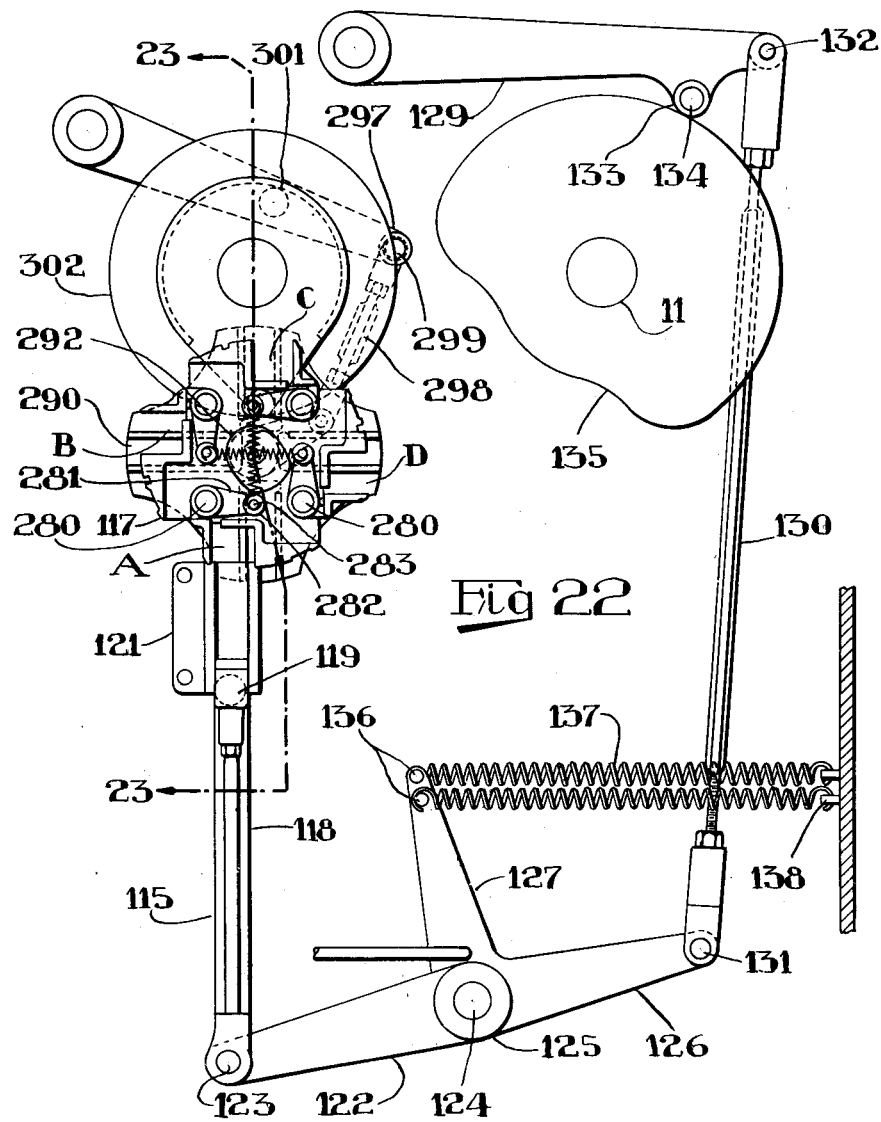

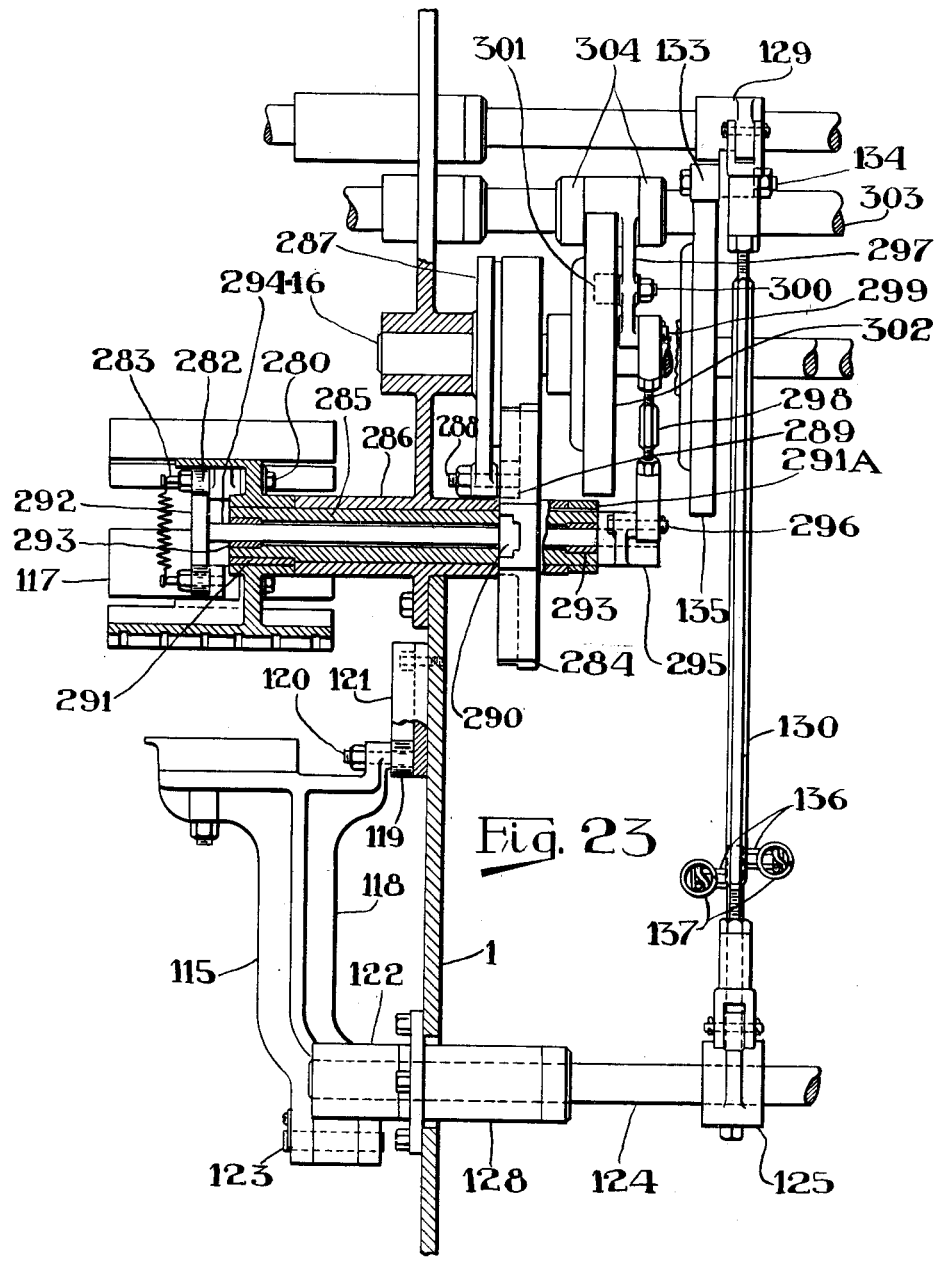

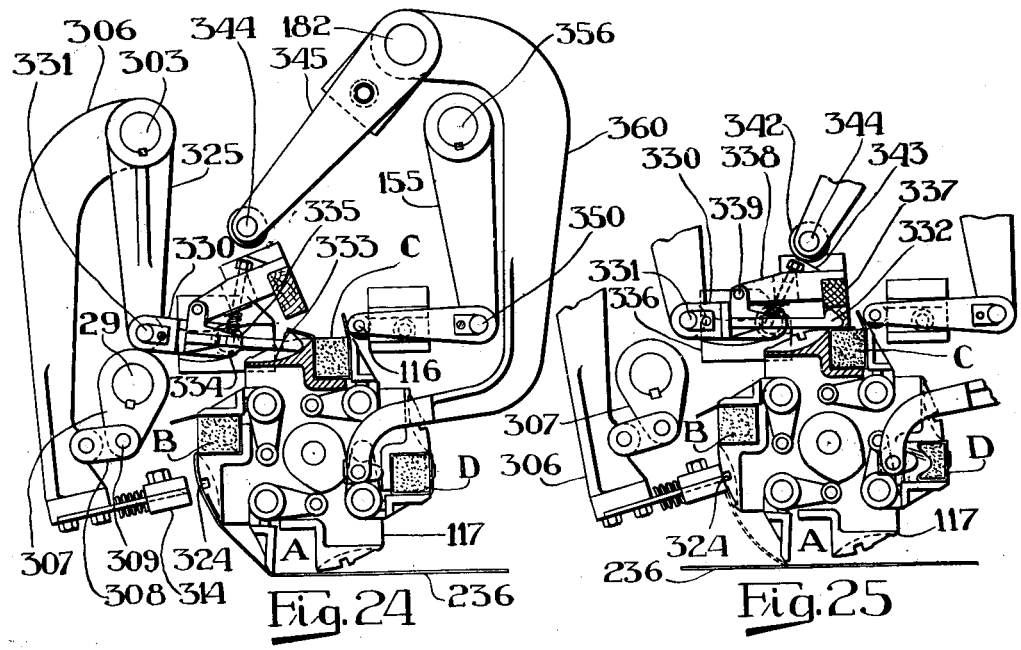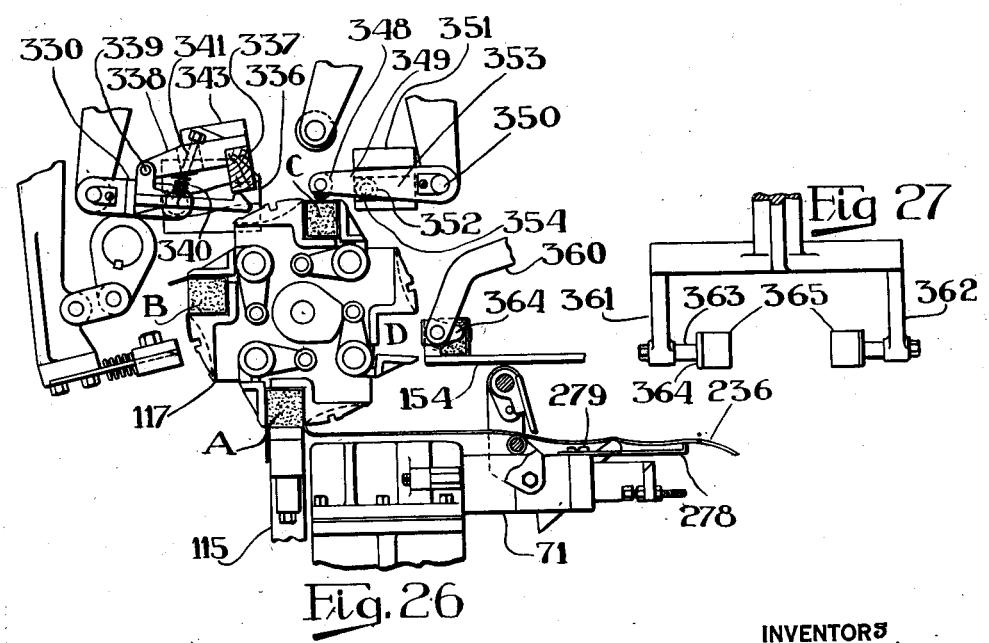

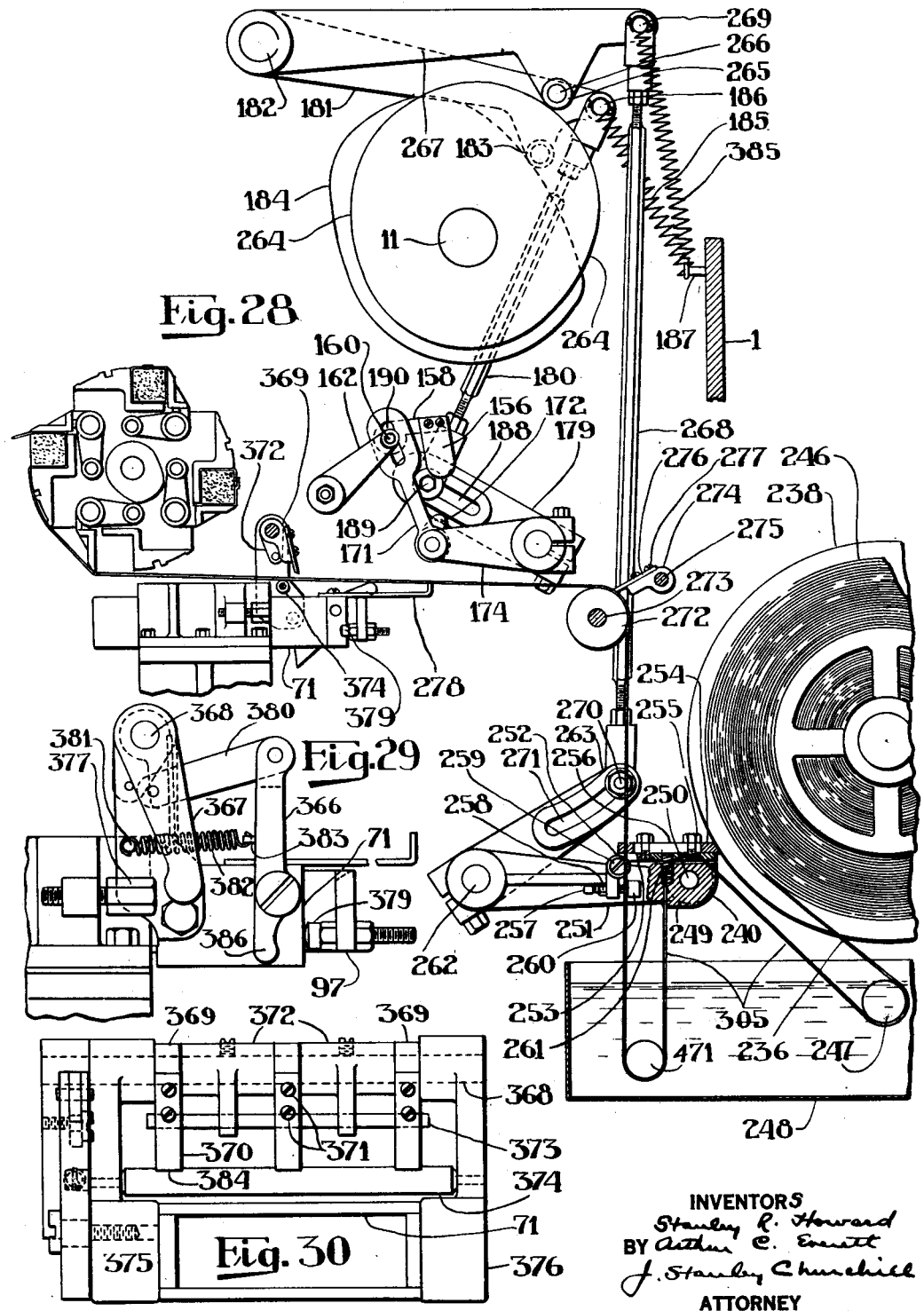

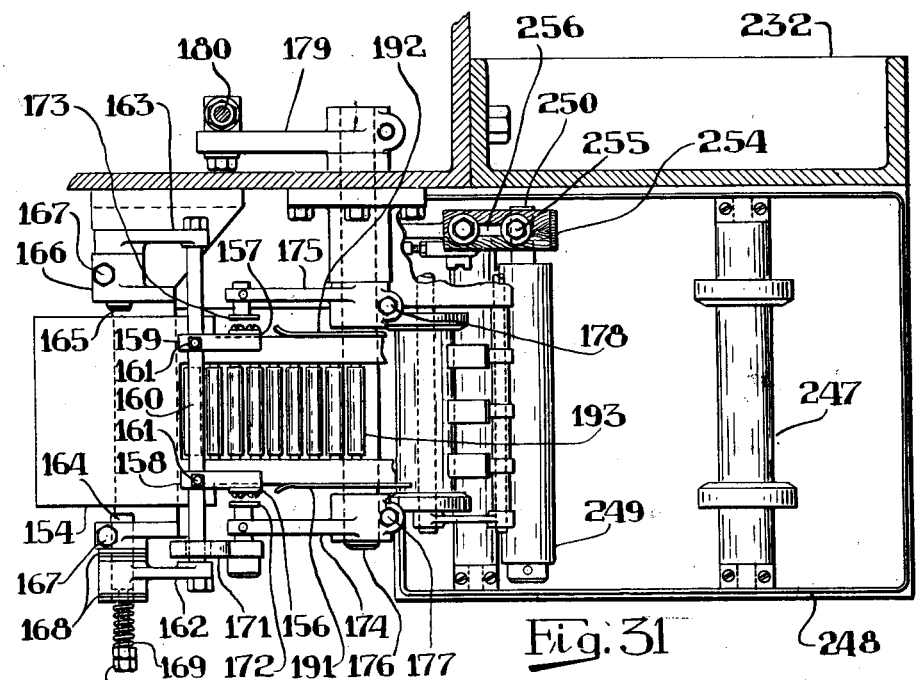
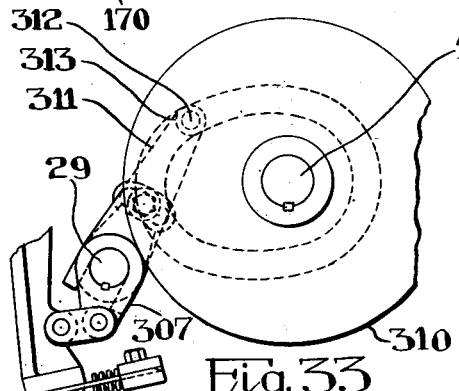
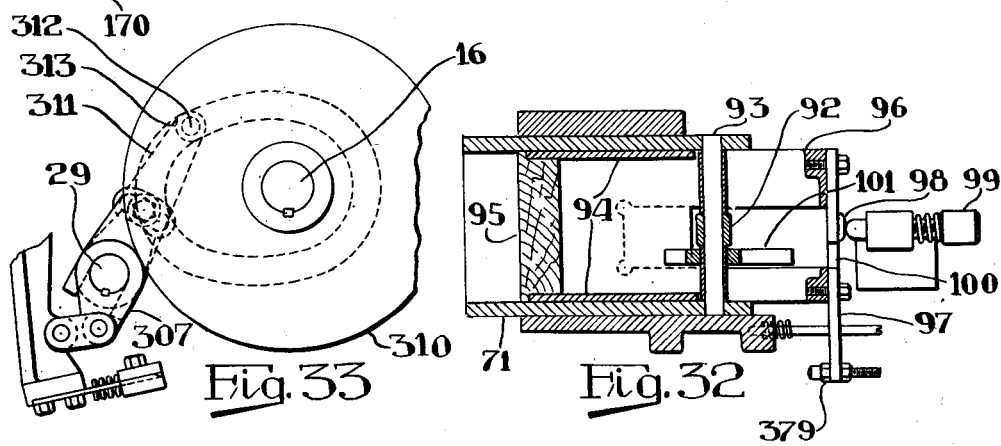

Patented Apr. 17, 1934

1,955,331

UNITED STATES PATENT OFFICE 1,955,331

WRAPPING MACHINE

Stanley R. Howard, East Milton, and Arthur Clarence Everett, Boston, Mass., assignors to Pneumatic Scale Corporation Limited, Quincy, Mass., a corporation of Massachusetts Application September 20, 1929, Serial No. 393,954

18 Claims. (Cl. 31—14)

This invention relates to a machine for producing wrapped sections or cakes of moldable material, such as butter, lard, yeast, cheese, and the like.

In general, the object of the invention is to provide a novel machine for the purpose specified which is adapted to produce the wrapped cakes or sections of the moldable material rapidly, economically, and in a manner such as to insure the production of wrapped cakes or sections of substantially uniform size.

A further and more specific object of the invention is to provide a novel construction of automatic machine for forming individual cakes or sections from a mass of moldable material and then wrapping successive cakes thus formed in a wrapper.

A still further object of the invention is to provide a novel machine of the character specified, which is particularly designed for the handling, forming and wrapping of cakes of butter in an economical and superior manner, such that the market value of the butter is not diminished by the operator of the machine.

With these objects in view and such others as may hereinafter appear, the invention consists in the machine and in the structures, arrangements and combinations of parts hereinafter described and particularly defined in the claims at the end of this specification.

In the drawings illustrating the prefrred embodiment of the invention, Fig. 1 is a front elevation of the machine; Fig. 2 is a plan view of the same; Fig. 3 is a sectional view illustrating the feed hopper and the mechanism for forming the individual cakes; Fig. 4 is a section on the line 4—4 of Fig. 2; Fig. 5 is a section on the line 5—5 of Fig. 3; Fig. 6 is a sectional view illustrating the mechanism for preventing the formation of undersized cakes; Fig. 7 is a plan view of a portion of the mechanism shown in Fig. 6; Fig. 8 is a section on the line 8—8 of Fig. 7; Fig. 9 is a section on the line 9—9 of Fig. 7; Figs. 10, 11 and 12 are sectional views illustrating the operation of the mechanism for controlling the formation of an individual cake from a mass of the moldable material; Fig. 13 is a sectional view on the line 13—13 of Fig. 11; Figs. 14 and 15 are details in plan and cross-section respectively of the plunger forming a part of the cake forming mechanism; Figs. 16 and 17 are plan and side elevations respectively of the cut-off plate to be referred to; Fig. 18 is a plan of the cutting knife; Fig. 19 is a sectional view on the line 19—19 of Fig. 18; Figs. 20 and 21 are front and end views respectively of the severing device for severing the individual cake from the mass of moldable material; Fig. 22 is a front view of the transfer mechanism for positioning the cake in the spider pockets forming part of the wrapping mechanism; Fig. 23 is a sectional view on the line 23—23 of Fig. 22; Figs. 24, 25 and 26 illustrate the spider and longitudinal wrapper folding mechanism in various positions of operation; Fig. 27 is a view of the ejector mechanism and the first end folding device; Fig. 28 is a front elevation of the wrapper feeding mechanism; Fig. 29 is a side elevation of the wrapper positioning mechanism; Fig. 30 is a view from the right of the mechanism shown in Fig. 29; Fig. 31 is a plan view of the end folding mechanism; Fig. 32 is a sectional view of the sliding die and hollow plunger to be referred to; and Fig. 33 is a view of the operating mechanism for the paper cutter.

In general the present machine is designed to form individual cakes of the moldable material and to wrap successive cakes in a wrapper in an automatic economical manner, and in the illustrated embodiment of the invention provision is made for forming the individual cakes from lumps or irregular masses of the moldable material by the production first of a uniformly shaped slab of the moldable material from such lumps or masses, preferably by compression, and the subsequent severing of a predetermined size of cake from the slab thus formed. Provision is also preferably made for controlling the operation of the cutting mechanism to prevent the formation of undersized cakes.

Referring now to the drawings, the operating mechanisms for forming the uniformly dimensioned slab of the moldable material from the irregular lumps or masses of the same, together with the mechanism for severing the individual cakes from the slab thus formed and the mechanism for wrapping the individual cakes to produce the wrapped cakes or sections are mounted upon a frame 1 provided with an enclosing case or cover 2 completely enclosing the top section of the frame to render it moisture and dust-proof. The cover is provided with an inspection cover 3 at the top thereof.

As stated, the illustrated machine is designed to first form the individual cakes by converting the moldable material, which will hereinafter be referred to as butter, into a slab of uniform section from any shaped lumps or pieces thereof deposited in a chute 21 by the operator. Within the chute 21 the butter descends by gravity and succeeding sections are cut off from the bottom of the mass of butter within the chute by a cut-off knife 22 mounted to slide across the bottom opening of the chute, as shown in Fig. 3. As each section is cut off it is advanced by a plunger 38 into the forward part of a forming chamber or die 39 and subjected to compression, as will be described, to convert the several sections into a uniform slab of predetermined dimensions. Provision is made for severing, as by a wire cutter 105, an individual cake from the end of the slab of butter thus produced within the forming die 39 and for thereafter transferring the formed cakes to operative position with relation to wrapping mechanism by which successive cakes may be wrapped in paper and thereafter discharged from the machine on a conveyor, as will be described, in a position in which an operator may conveniently pack a plurality of the wrapped cakes in a carton.

As herein shown the cut-off knife 22, by which successive portions of the lumps of butter at the bottom of the chute 21 are removed, is slidably guided in a bracket 40 and is arranged to reciprocate at each cycle of operation of the machine. The cut-off knife 22 receives its motion from the cam 25, Fig. 2, on the shaft 18 and such motion being transmitted through a cam path and cam roller 26, the latter being free to turn on a stud 27 mounted on a lever 28 rotatably mounted on the shaft 29. One end of a connecting rod 30 is connected to the end of the lever 28, the other end being connected to a lever 31 fastened to one end of a sleeve 32 free to oscillate on the shaft 33, as shown in Fig. 4. On the other end of said sleeve 32 is secured a lever 34, the outer end of the sleeve being connected by a connecting rod 35 to bearing blocks 36 on the cutter knife 22.

The machine is driven from any external source of power by means of a clutch pulley 6 operatively connected to the shaft 7 by a clutch mechanism of any common form fast on the shaft and which can be operated to start or stop the machine by means of the starting handle 10 to throw the clutch members into or out of engagement with the pulley. When the clutch is in engagement with the clutch pulley 6, the shaft 7 is caused to rotate and drives the shaft 11 through a pinion 12 keyed to the shaft 7 and through a gear 14 fast on the shaft 11. The gear 15 is fast on the shaft 11 and drives the shaft 16 through a gear 17 fast on said shaft 16. The gear 17 drives a shaft 18 through a gear 20 fast on the shaft 18. The gears 15, 17, and 20 are preferably of the same size and consequently the shafts 11, 16, and 18 run at the same speeds. These shafts contain most of the cams which operate the various mechanisms as will be hereinafter set forth.

The cutter knife 22 is provided with holes 37 to allow any air to escape when the plunger 38 operates to compress each succeeding portion of butter that has been cut off at the bottom of the feed chute. These holes assist in preventing the formation of imperfect cakes, because if air becomes locked in the forming chamber or die 39, air bubbles or voids will form in the mass. The plunger 38 is guided in the bracket 40 and functions to compress each succeeding mass of butter cut off by the knife 22 against the previously cut off amount forcing the whole mass through the die 39 formed in the bracket 40 thus squeezing out all air pockets and voids in the mass and forming a solid bar of butter conforming to the shape of the die and at the same time forcing the end of the bar out through the end of the die 39 a predetermined amount so that when said projecting portion is cut off a cake of predetermined dimensions may be formed ready to be wrapped.

The plunger 38 has a reciprocatory motion and check valves 41 are provided on the end of the plunger, so that as the plunger retracts after the end of the compression stroke the vacuum or suction formed between the end of the plunger and the mass of butter is broken by the air flowing through these valves. Each valve consists of a valve member 42 slidably mounted in a bearing sleeve 43 having a valve seat 44 formed on the external end thereof. A collar 45 is firmly attached to the internal end of the valve stem 46 to limit the outward movement of the valve. The valve stem 46 is provided with a longitudinal hole 47 through the center of the stem and transverse holes 48 at the end of the longitudinal hole 47 so that the suction between the end of the plunger 38 and the mass of butter draws the valve outwardly until the collar 45 strikes the end of the valve bearing 43 and the transverse holes in the valve stem admit free air through the holes in the valve stem and out between the valve and its seat, thereby breaking the vacuum between the mass of butter and the plunger. On the inward stroke of the plunger 38, the valves 41 remain open until they strike the mass of butter and any air that is located between the plunger and such mass of butter is permitted to escape until the plunger has come in contact with the butter sufficiently to close the valves 41. These valves also function to prevent small mass chunks of butter adhering to the end of the plunger on the backward stroke by reason of the vacuum created in the chamber and also to prevent air pockets and voids forming in the mass of butter on the compression stroke of the plunger. The plunger 38 is preferably provided with a wooden end member 49 to further minimize the tendency of the butter to adhere to the end of the plunger 38.

This plunger 38 is reciprocated by mechanism including an eccentric 50 on the shaft 11 and which is enclosed by the eccentric strap 51. A connecting rod 52 is adjustably connected to the eccentric strap 51 and is adjustable by means of the split threaded clamp collar 53 provided with a clamping screw 54 to clamp the collar 53 in position after any adjustment in the connecting rod 52 has been made. The lower end of this connecting rod is guided in a bearing 55 located in one end of the sleeve 56, the other end of the sleeve being provided with a bearing 57 free on the connecting rod and arranged to take the thrust of the spring 58. The lower bearing 57 is formed with trunnions 59 which are free to oscillate in bearing blocks 60 supported in the outer end of a bifurcated lever 61, these bearing blocks being rigidly held in position by means of screws 62. The compression of the spring 58 is regulated by means of a hand wheel 63 threaded on the connecting rod 52. The outer end of the connecting rod 52 is provided with a nut 64 and lock nut 65 threaded thereon with a collar 66 between the nuts and the lower bearing. The bifurcated lever 61 is fast on the shaft 33 and oscillates the shaft 33 with each cycle of operation of the machine. The plunger lever 67 is also fast on the shaft 33 and a connecting rod 68 connects the outer end of this lever 67 with the plunger 38. The pins 69 and 70 hold the connecting rod in oscillating connection. It will be observed that as the die or slab forming chamber 39 becomes filled with the butter, the spring 58 will yield at whatever pressure it is adjusted for, and in practice the adjustment is regulated to correspond to the normal amount necessary to form the mass into compact form free from voids and air pockets. This adjustment takes care of the variation in the amount of butter cut off by the knife 22 owing to irregularities in the lumps fed through the chute 21 and therefore a sufficient pressure is employed at all times to compress the butter into the mass or slab in the die chamber 39.

The movement of the plunger 38 also serves to force the end of the slab of butter thus formed outwardly through the die opening formed in the end of the die chamber 39, and in order to control the width of the slab of butter to be cut off from the end of the slab thus protruding from the die, provision is made for operating the cutting mechanism when the protruding portion of the slab has been moved into a predetermined position. As herein shown a hollow sliding die 71 preferably having the same cross-sectional area as the butter slab is operatively supported in alignment with the die opening in the end of the die chamber 39 in a position in which the end portion of the protruding butter slab may be forced into the interior of the hollow die. The sliding die 71 is provided with a hollow plunger 94, see Fig. 32, having a solid end member 95 preferably made of wood. In the operation of the machine, as shown in Figs. 10, 11 and 12, the end of the butter slab as it emerges from the die chamber 39 is forced into the interior of the hollow sliding die 71 operating to push the plunger 94 outwardly with relation to the hollow sliding die 71 until the striking block 98 on the end of the plunger comes in contact with the stop screw 99 whereupon the pressure on the plunger block 38 is relieved in a manner to be described and the sliding die 71 is moved backwardly eliminating the pressure between the end of the butter slab and the hollow plunger 94, as will be described, and enabling the wire cutter 105 to be readily operated to sever the cake from the end of the butter slab and leaving the cake thus formed operatively supported upon the elevator 115 ready to be lifted into the pocket A of the wrapping spider 117.

Referring now to Figs. 10, 11 and 12, the sliding die 71 is slidably mounted in a bracket 72 and is arranged to be reciprocated by a cam 73 fast on a clutch disk 74 and normally the sliding die operates in timed relation to the operation of the plunger 38. The cam 73 is provided with a cam path 77 with which cooperates a cam roll 75 mounted at one end an arm 76. The arm 76 constitues one arm of a lever 79, fulcrumed and free to turn on a shaft 29 the second arm 78 of which is connected by a connecting rod 80 to a lever 82, suitable pins 81 and 83 being provided for this purpose. The lever 82 is fast on the shaft 84 and an arm 85 is also fast on the shaft 84. The arm 85 is connected by a connecting rod 86 to a cam segment 88, suitable pins 87 and 89 being provided. The cam segment 88 is free to oscillate on the shaft 90. The cam segment 88 is connected to the sliding die 71 by means of a slotted arm 91 formed integrally with the cam segment 88 cooperating with a bearing block 92 forming a bearing for a pin 93 upon the sliding die 71.
Through the mechanism described, the sliding die 71 is reciprocated by the cam 73 in timed relation to the operation of the plunger 38 and remaining portion of the machine.

The hollow plunger 94 is provided at one end with a solid end member 95 preferably of wood and designed to engage the end of the butter slab with minimum liability of adherence thereto, and the opposite end of the plunger is provided with elongated openings 96 to allow the hollow plunger 94 to slide within the movable die 71 and to clear the pin 93. In order to control the width of the cake of butter to be cut from the end of the slab, provision is made for causing the cutting operation to be performed when the end of the slab has been moved into a predetermined position.
For this purpose the outer end of the plunger 94 is provided with a plate 97 having a hardened striking plug 98 mounted thereon arranged to contact with the stop screw 99 and limit the outward movement of the plunger. This plate 97 is provided with a latching portion 100. Mounted free to turn on the pin 93 is a latch 101, one end of which is formed to latch over the latching portion 100 of the end latching plate 97, when the plunger 94 is in the extreme outward or rearward position, Figs. 10, 12 and 32. The cooperation of the latch 101 with the portion 100 causes the plunger 94 to be brought forward with the sliding die 71, when the latter is moved into contact with the stationary die 39, as shown in Fig. 10, ready to receive the end of the butter slab. A pin 102 mounted on the bracket 72 in alignment with the travel of the latch 101 is so arranged that the tail of the latch 101 contacts with it thus lifting the latch 101 when the sliding die 71 is in its forward or inward position. When the sliding die 71 is in its extreme inward or forward position and the latch 101 has been disengaged from the latching plate 97, it permits the hollow plunger 94 to be moved rearwardly as the mass of butter 103 is forced out of the forming die 39 and into the sliding die 71, the latter being held firmly in position to receive the butter. As the plunger 38 forces the end of the mass of butter into the sliding die 71, the hollow plunger 94 is forced rearwardly by the butter until the striking plug 98 on the end of the plunger comes in contact with the stop screw 99. At this point the pressure on the plunger block 38 is relieved, primarily by means of the rearward movement of the plunger 94 cooperating with other means as will be hereinafter described. As the pressure on the butter 103 in the die is relieved, the sliding die 71 is moved rearwardly by means of the lever 91 operating as above described and as the die approaches the end of its rearward stroke, the cam roll 104 carried by the lever 220 follows the drop in the cam 88, Fig. 12, and causes the stop screw 99 to move away from the end of the hollow plunger 94, thereby freeing the pressure between the end of the butter and the end member 95 of the hollow plunger 94. As the sliding die 71 is being reciprocated rearwardly the end of the bar of butter projecting from the forming die 39 is severed by downward movement of a wire cutter
105. The wire cutter 105 is fastened to the frame 106 by means of screws 107, the frame being mounted on the end of an arm 108 operated by means of the cam 73, the latter also operating the sliding die 71 as previously described. The arm 108 is pivotally supported on a stud 109 fastened on a bracket 40 and bearing projections 110 for a pin 111 held in position by a set screw 112 are formed on one end of the bracket 40. A sliding block bearing 113 is free to turn on the pin 111 and also free to slide in a slot 114 formed in the arm 85 thus forming an operative connection between the arms 85 and 108, the arm 85 being fast on the shaft 84 and oscillating with it.

As the cake of butter is severed by the wire cutter 105, it is supported upon the elevator 115, and provision is then made for operating the elevator to raise the severed cake and lift it vertically into the pocket "A" in the wrapping spider 117. The elevator 115 comprises a vertical arm 118 having a roll 119 and stud 120 mounted on one side of the top edge of the arm 118. The roll 119 is guided in a vertical cam path in a bracket 121 fast to the frame of the machine to impart substantially straight up and down motion to the elevator. The opposite or lower end of the arm 118 is provided with a fork straddling the end of a lever 122, the latter being pivotally connected to the fork by means of the pin 123. The lever 122 is fast on the shaft 124 and is oscillated by it. A bell crank lever 125 having two arms 126 and 127 is keyed to the shaft 124 and is supported in a bearing 128 fastened to the frame 1. One arm of the bell crank is connected to a cam lever 129 by means of a connecting rod 130 and by the pins 131 and 132. A cam roll 133 is mounted on a stud 134, one end of which is fast on a lever 129 and the rotation of the cam 135 fast on the shaft 11 imparts to the elevator 115 a vertical reciprocating motion. The second arm 127 of the bell crank lever 125 is provided with pins 136 to which one end of springs 137 are fastened, the other end of said springs being fastened to hooks 138 in the frame of the machine. These springs keep the cam roll 133 in contact with the cam 135 during the operation of the elevator.

In order to facilitate the operation of the wire cutter 105, provision is made for relieving the pressure of the plunger 38 exerted on the butter in the forming die 39 as above stated, and as herein shown a segment 139 having ratchet teeth 140 is rigidly connected to the lever 67 and oscillates with it. The bracket 40 is provided on its under side with a bearing support 141 carrying a shaft 142 provided with an eccentric 143 on one end and with a pawl 144 mounted to turn freely on said eccentric. The pawl 144 is provided with a spring 145, one end of which is fastened to a hook 146 in the frame of the machine, the other end being fastened to a hook 147 attached to the underside of the pawl. A stop block 148 fast to the supporting member 141 is located so that the rear portion of the pawl 144 will be held in contact with the stop block by the spring 145. A lever 384 is fastened on the opposite end of the shaft 142 from that on which the eccentric is formed, the outer end of the lever being connected by means of the connecting rod 149 and pins 150 and 151 to the lever 34 which operates the cutting knife. In operation, on the inward stroke of the butter cutting lever 34, the eccentric 143 is turned counter-clockwise and operates to lift the pawl 144 so that the contacting point of the pawl is raised out of engagement with the ratchet teeth 140. On the backward stroke of the lever 34 the eccentric 143 is turned in a clockwise direction and lowers the point 153 of the pawl into engagement with the ratchet teeth 140 on the segment 139 and causes the segment 139, and hence the plunger 38, to retract slightly thus relieving the forward pressure on the butter in the forming die 39 and therefore preventing any further forward movement of the butter into the sliding die 71. At this time in the operation of the machine the hollow plunger 94 is released, as above described, to allow the projecting cake of butter to be cut off by the wire 105. As the cut off knife 22 operates in advance of the plunger 38, it will be seen that the pawl 144 is always out of engagement with the ratchet teeth when the plunger 38 and the ratchet teeth 140 are moving in a clockwise direction.

From the description thus far, it will be observed that the stopping position of the plunger 38 is determined by the amount of butter cut off each time by the cut-off knife 22 and also by the amount of butter within the forming die 39, and in the illustrated machine the ratchet segment 139 is provided with a sufficient number of teeth so that the pressure on the butter can be relieved at any position in which the plunger 38 happens to stop. In order, however, to prevent the cutting of undersized cakes of butter, provision is made for controlling the operation of the sliding die 71 to prevent the operation of the cutting mechanism. For this purpose, and as herein shown, a one revolution clutch 195, Fig. 7, of any common or well-known type is provided upon the shaft 18, one part of the clutch being fast on the shaft 18, and the other part being free on the shaft 18, and having rigidly connected with it the cam 73 which operates the sliding die 71 and the butter cutting mechanism 105. The clutch 195 is free to operate and to drive the cam 73 when the lever 196 is held out of engagement with a dog 197 of the clutch 195. A cam 198 is fast on the shaft 18 and revolves with each cycle of operation of the machine. This cam operates to rock the lever 199 which is free on the shaft 202 through the roll 200 and a stud 201 fastened to the lever 199. At the outer end of this lever 199 one end of a spring 203 is attached, the other end of said spring being fastened to a pin 204 held in the frame of the machine, the spring acting to keep the roll 200 in contact with the cam 198. One end of a connecting rod 205 is connected to an arm 206 of a bell crank lever 207 and the other arm 208 of the bell crank lever is connected, by means of the connecting rod 209, to an arm 210 fast on the vertical shaft 211. As the cam 198 revolves, the rod 205 rocks the bell crank lever 207. A spring 212 is held on the lower part of the connecting rod 205 by the collar 213, the rod passing freely through a hole in the outer end of the arm 206 of the bell crank lever. The upward movement of the rod 205 operates to rock the vertical shaft 211 in a counter-clockwise direction and hence swing the arm 196 out of the line of engagement with the dog of the clutch 195, thereby allowing the cam 73 to operate and effect movement of the sliding die 71 and also the operation of the cutter 105. If, however, an insufficient quantity of butter has dropped through the feeding chute 21 so that a full cake is not formed at the end of the forming die 39, a lever 216 which is fast on a shaft 214 remains in the path of movement of a lever 215 which is fast on the vertical shaft 211 and prevents the shaft 211 from turning and hence prevents the lever 196 from moving out of engagement with the dog on the clutch 195 and the sliding die 71 remains in its inward position and the bar of butter is not cut off. The lever 216 is fast on one end of the shaft 214 and fast on the other end of said shaft is a lever 223 which is operatively connected to a lever 219 fast on one end of a shaft 221 by a connecting rod 222. The lever 216 is normally held in the path of travel of the lever 215 by the spring 217, and the latter holds the lever 219 normally against a stop pin 218 fast to the frame of the machine.

In operation when the hollow plunger 94 has been forced back by the butter until the end of the plunger has come against the stop screw 99 in the lever 220, fast on the shaft 221, and rocks this shaft a slight amount, the movement of the plunger in this direction also rocks the lever 219 in a counter-clockwise direction and raises the lever 216 out of the path of travel of the lever 215. This movement also brings the roll 104 in contact with the cam segment 88 as a stop as shown in Fig. 12. It will be observed from Figs. 10, 11 and 12 that when proper operation conditions are obtained the stop screw 99 has three operative positions. In Fig. 10 the roll 104 is away from the cam segment 88 so that the last fraction of movement of the hollow plunger 94 moves the roll 104 into contact with the cam segment as in Fig. 11 and this slight movement is enough to allow the sliding die 71 to operate and the cake to be cut off, and as the cam segment 88 rotates, the roll 104 follows the cam 88 as in Fig. 12, thus relieving the pressure on the cake. It will be apparent from the above description, therefore, that when the hollow plunger 94 has not been forced back far enough by the butter to form a cake of predetermined size, the lever 216 will remain in the path of the lever 215 and prevent the clutch 195 from operating, and hence prevent the operation of the sliding die 71 and butter cut-off wire 105. Under normal operating conditions a cake of butter of predetermined size is severed from the end of the slab at each cycle of operation, but in the event that the slab of butter is not forced into the sliding die 71 to a position such that a cake of such predetermined size would be formed by the wire cutter 105, then both the sliding die 71 and the wire cutter 105 would be prevented from operating as heretofore explained, and the elevator 115 as it rises will come against the bottom of the sliding die 71 and be yieldingly held there by springs 137. One end of a connecting rod 224 is connected through the swivel 225 to the lever 226 fast on the vertical shaft 211. The connecting rod 224 is free to slide through the swivel 225 in a counter-clockwise direction as in Fig. 9, without moving the lever 226. The collar 227 on the end of the connecting rod 224 moves the lever 226 in a clockwise direction. It will therefore be apparent that when the machine is working normally and full size cakes of butter are being formed and cut off, the arm 196 is thrown in and out of the clutch engaging position by means of the cam 198 and spring 203. If, however, the formation or movement of the butter slab is such that cakes of insufficient size are formed, then the lever 216 will remain down in the path of the arm 215 and the vertical shaft 211, without being rocked so as to move the arm 196 away from the clutch engaging position. A further control is provided to prevent the sliding die 71 from operating when there is insufficient butter being delivered, and comprises an arm 228 fast on the same shaft 33 as the arm 67 which operates the plunger 38. The end of the arm 228 is provided with a slot in which a pin 229 clampingly held by the nut 230 is adjustably held. The pin 229 may be so adjusted in the slot that it will strike the edge of the arm 208 of the bell crank lever 207 if the plunger 38 makes a full forward stroke, which is indicative that there was an insufficient quantity of butter supplied from the feeding hopper 21, in which case the pin 229 prevents the arm 208 from turning in a counter-clockwise direction as the cam 198 passes under the roller 200 and lifts the lever 199, thus holding the arm 196 in the dog engaging position and preventing operation of the sliding die 71 and cake cutter 105. It will thus be seen that the control of the size of the cake to be cut off is controlled both by the plunger 38 and the movement of the hollow plunger 94.

After each individual cake of butter is severed by the wire cutter 105 from the end of the slab of butter in the manner above described, it rests upon the elevator 115, and provision is then made for lifting the elevator to deposit the butter cake in the first pocket of the wrapping mechanism at the station A. In general the wrapping mechanism includes a spider intermittently rotated and provided with four pockets and during the rotation of the spider from the initial station A to the final or ejecting station D, the paper wrapper is wrapped tightly around the body of the butter cake leaving the unfolded ends of the wrapper projecting beyond the ends of the cake. After the partially wrapped cake leaves the pocket of the spider at the final station D, provision is made for folding the projecting ends of the wrapper during the movement of the cake along the supporting member 154 and onto the supporting table 194, as will be described.

The wrapping paper 236 is supplied to the machine in rolls which are held on a reel 231 generally shown in Fig. 2. The reel 231 comprises a bracket 232 fastened to the frame 1 of the machine and adjustably supports the roll of paper. The shaft 233 is held fast in the bracket 232 by a set screw 234 and adjustable collars 235 are threaded on the shaft 233 for the purpose of adjusting the position of the roll of paper. A sleeve 237 is rotatable on the shaft 233 and has attached to one end a disc 238 having a brake surface 239 therein to which a friction member 254 is applied to prevent excessive unwinding of the paper. On the other end of the sleeve 237 a disc 241 is held by the set screw 242, the collar 243 and the spring 244, and the nut 245 threaded on the end of the shaft 233 keeps the reel 231 in position against the threaded adjustable collar 235. The end disc 241 is removable over the collar 243 and spring 244 to permit the rolls of paper to be assembled in the reel. As the paper 236 is drawn from the roll 246 it travels around a roll 247 rotatably mounted in the water moistening container 248, after which it passes up over a take-up roller 249, Fig. 31, rotatably mounted on the stud 250 fixed in the end of an arm 251. On the outer end of the arm 251 is mounted a bell crank 252. One arm 253 of the bell crank has fastened to it a friction member 254 made of wood, fibre or other suitable material and is adjustably clamped to the arm 253 by means of the screws 255, the slot 256 being provided to allow adjustment of the friction member 254. The other arm of the bell crank 252 is provided with an adjusting screw 257 and a lock nut 258 to lock it in position. The bell crank lever is held in position by means of the shoulder screw 259 which is threaded in the arm 251. A stop plug 260 is formed on the arm 251 for the stop screw 257 to strike against. A spring 261 serves to raise the arm 253 on the bell crank lever 252 and tends to keep the stop screw 257 against the stopping plug 260. As the arm 251 is raised, the paper is drawn from the roll 246 and as the arm 251 reaches its extreme upward position, the friction member 254 comes in contact with the disc 238 and acts as a brake to prevent any further rotation of the disc 238 and hence stops the further unwinding of the paper. The arm 251 is fast on the shaft 262 and is operated through the shaft 262 and the adjustable arm 263, also clamped on the shaft 262. The arm 251 is rocked by means of the cam 264 fast on the shaft 11, operating on the roller 265 mounted on a stud 266 on a lever 267. The lever 267 is free to turn on the shaft 182 and is connected to the adjustable arm 263 by means of the connecting rod 268, one end being connected by the pin 269 and the other end being adjustably connected by means of an adjustable connecting pin 270 located in the adjusting slot 271 of the arm 263. A spring 385, one end of which is fastened to the pin 269, the other end being fastened to the frame of the machine, serves to hold the cam roller 265 against the surface of the cam 264 and hence return the roller 265 to its downward position. After the paper passes over the roller 240 it travels over a roller 471 which is rotatably mounted in the water container 248 and up over the roller 272 which is rotatably mounted on the stud 273 fast on the frame of the machine. A pawl 274 mounted to turn free on the stud 275 has a plate 276 fastened thereto by means of the screws 277. The point of the pawl 274 bears on the paper as it is drawn over the roller 272 and allows free movement of the paper toward the wrapping mechanism but prevents the paper from moving backward when the tension roll 249 is raised to draw the paper from the roll 246. It will be observed that as the wrapping paper is first drawn from the roll 246 it is immersed in water and moistened before it is wrapped around the cake of butter. A bracket 278 is provided to support the web of paper and is fastened by means of the screws 279 to the end of the sliding die 71. This support tends to keep the paper web from dropping down and forming a large loop of paper at this point.

After a cake of butter has been formed and cut off as heretofore described, it is lifted vertically by the elevator 115 and placed in the bottom pocket "A" of the spider 117, at the same time carrying with it the web of paper and thus wrapping the paper around three sides of the body portion of the cake as shown by Fig. 26. It will be apparent that as herein shown, in first starting the machine, the paper web has to be manually drawn through the machine a sufficient amount to interpose the web between the butter cake and the pocket at station A. Thereafter the web is cut off and automatically left in position for the succeeding cakes to be wrapped. The wrapping mechanism consists of the spider 117 generally shown at Figs. 22 and 23 which contains the four pockets, A, B, C and D, one side of each of which is free to move to clamp and hold the cake within the pockets while being wrapped and to open when the cake is to be removed therefrom. The movable side of the pocket is mounted on a stud 280 fast in the web of the spider 117 and has formed with it a right angle arm 281 carrying a roller 282 on a pin 283 fastened to the arm 281. The spider 117 is rotated intermittently by a Geneva motion of usual form. The slotted or driven portion 284 of the Geneva is secured on a sleeve 285 supported in a bearing 286 formed with the frame of the machine. The driving member 287 of the Geneva is secured on the shaft 16 and carries a stud 288 on which is mounted a roll 289 operating in the slots 290 to turn the Geneva 284 in the usual manner, thus turning the spider 117 a quarter revolution at each cycle of operation of the machine. The spider 117 is secured on the outer end of the sleeve 285 by means of the key 291 and the Geneva spider 284 is secured on the outer end of the sleeve 285 by means of the key 291A. A shaft 294 provided on one end with a cam 292 is supported in the sleeve 285 by means of a bearing 293 and is free to oscillate therein. On the other end of the shaft 294 is fastened an arm 295 having a stud 296 fastened therein which is connected to the cam arm 297 by means of the connecting rod 298 and by the pin 299 fast on the end of the cam arm 297. The cam arm 297 has a stud 300 fast thereon on which a cam roller 301 is mounted and a rocking motion is imparted to the cam arm 297 by the cam 302. The cam 302 is fast on the shaft 16; while the cam arm 297 is free to oscillate on the shaft 303 and is held in position by the collars 304. The cam 302 imparts an oscillating motion to the cam 292 which is so timed that the spider pocket "D" is opened to release the cake at the discharge station "D" and remains open while the spider makes a quarter turn to the station "A" and remains open until a cake has been placed in operative position within the pocket, at which time the cam 292 is operated to close the pocket at station "A". The pockets at stations "B" and "C" are always being closed to hold the cake.

When a cake has been placed in the pocket at "A" by the elevator 115, the spider 117 makes a quarter revolution and carries the cake to station "B" carrying the wrapping paper 236 drawn from the loop 305 by the arm 251 as previously described, the paper lying over the succeeding pocket "A" in the spider 117. Provision is made for cutting the paper web to form an individual wrapper and for this purpose an arm 306 which is mounted to swing free on the shaft 303 is operated by means of an arm 307, connecting rod 308, and connecting studs 309. The arm 307 is fast on the shaft 29, Fig. 33 and is rocked by means of the cam 310 on the shaft 16. A cam lever 311 on the shaft 29 has a stud 312 mounted therein which carries a cam roll 313 and is operated by the cam 310. Fastened to the end of the arm 306 is a paper cutting knife 314, Fig. 24, having a saw toothed cutting edge as shown in Figs. 18 and 19. The cutting edge of the blade is provided with a movable stripper member 315 consisting of two members 316 and 317 clamped together by means of the screws 318 and 319. These members are normally held to overlap the cutting edge as shown in Figs. 18 and 19 by means of the springs 320, the latter being held in slots 321 in the knife blade 322. The pins 323 which are fast in the member 317 project into slots 323A and limit the outward movement of the stripper member 315. As the arm 307 is operated by the cam 310 as heretofore described, the stripper member 315 first contacts with the wrapping paper 236 and on further movement of the lever 307 the springs 320 are compressed and the cutting knife 322 severs the paper at the slot 324 as shown in Fig. 24. After the cutting operation the end of the web of paper falls down to the position shown in Fig. 25 ready to be engaged by the next succeeding cake. The arm 325 is fast on the shaft 303 and is caused to oscillate by means of the cam 326, Fig. 2, on the shaft 18 and the cam lever 327. The latter is provided with a pin 328 which carries a cam roll 329 operating in the path of the cam 326, the lever 325 being fast on the shaft 303. An arm 330 is pivotally connected to the end of the lever 325 by means of the pin 331. On the outer end of the arm 330 is formed a series of lifting fingers 332 which are provided to lift and fold one side of the wrapper over the body portion of the cake, as shown in Figs. 24 and 25. These fingers enter grooves 333 cut in the periphery of the spider 117 thereby getting underneath the wrapping paper, first lifting it up away from the surface of the spider, and thereafter folding it over on the cake held in the pocket "C". A stud 334 is provided on one side of the arm 330 and a cam roll 335 free on the stud 334 travels in the cam 336 fastened to the frame of the machine. A presser block 337 is fastend to the end of the arm 338, the latter being mounted to turn on the pin 339 and being pivotally supported by projections on the arm 330. A spring 340 guided on the pin 341 fast in the arm 330, acts to normally keep the arm 338 in a raised position, as shown in Fig. 24, the arm having an opening through which the pin 341 is freely guided. When the folding fingers have reached their extreme inward position, as shown in Fig. 25, the roller 342 acts on the cam surface 343 formed on the top of the arm 338 and causes the block 337 to compress and set the folded-over portion of the wrapper against the cake as shown by Fig. 25. The roller 342 is mounted free to turn on the stud 344 in the lever 345 and the lever 345 is fast on the shaft 182, the latter receiving its motion through the cam 346, Fig. 2, acting through the lever 347 fast upon the shaft 182. As soon as the block has pressed the longitudinal fold on the body portion of the cake of butter as shown in Fig. 25, the roll 348 is caused to move across the cake of butter carrying with it and folding down the opposite longitudinal edge of the wrapper and completing the longitudinal fold. This roller 348 is supported in the end of the bifurcated arm 349 by means of the pin 116, the arm being guided by a cam 351 secured to the frame of the machine. The roller 352 which acts in the path 353 of the cam 351 is rotatably supported on the stud 354 at the center of the arm 349. The arm 349 is mounted free to turn on the pin 350 in the end of the lever 155. The latter is fast on the end of the shaft 356 and receives a reciprocatory motion by means of the arm 355, Fig. 2, fast on the shaft 356 and by means of the cam 357. A cam roll 358, operating in the cam path and mounted free to turn on the stud 359 fast in the end of the arm 355, is guided in the path of the cam 357. Arms 366 and 367 are carried by the sliding die 71, the arm 367 being fastened to the sliding die 71 and also to a shaft 368 on which is mounted arms 369 free to turn on said shaft 368. On these arms 369 are mounted plates 370 by means of screws 371. Fast on the shaft 368 are arms 372 which carry a rod 373 in the ends thereof. The rod 373 is arranged to contact with the back of the arms 369 counter-clockwise, as viewed in Figs. 28 and 29, thus lifting the points of plates 370 out of contact with a roller 374 rotatably mounted in brackets 375 and 376. The purpose of this device is to draw back the excess amount of wrapping paper as the sliding die 71 moves backwardly after the paper has been cut off by the paper cutting knife.

When the sliding die 71 is in the extreme inward position, the arm 367 rocks the shaft 368 so that the points of the plates 370 are held out of engagement with the roller 374, allowing the wrapping paper to be drawn forwardly. As the sliding die 71 is drawn backwardly, the points of the plates 370 are drawn against the roller 374, gripping the wrapping paper therebetween and moving it backward until the end 386 of the arm 366 contacts with the stopping screw 379 adjustably held in the end plate 97 of the hollow plunger 96. A connecting rod 380 is pivotally connected to the upper end of the arm 366, and to the arm 367. One end of a spring 382 is fast to a hook 383 in the arm 366, and the other end is fastened to a pin 381 in the bracket 376 on the lever 366 and the spring 382 tends to normally keep the points 384 of the plate 370 in contact with the roller 374. It will thus be seen that while the sliding die 71 is at its inward position and the spider 117 is revolving, drawing the wrapping paper from the roll 246, the points of the plate 370 are held out of contact with the paper.

From the description thus far, it will be understood that during the intermittent rotation of the spider 117 of the wrapping mechanism through the stations A, B and C, the body portion of the butter cake is wrapped, leaving the unfolded ends of the wrapper projecting outwardly beyond the ends of the cake. Provision is then made for folding these projecting end portions during the ejection of the cake from the pocket at the station D.

While the preferred embodiment of the invention has been herein illustrated and described, it is to be understood that the different features of the invention may be embodied in other forms within the scope of the following claims.

Having thus described the invention what is claimed is:—

1. In a wrapping machine, in combination, a forming die, a reciprocatory member for forcing a mass of moldable material through said die, cutting mechanism for cutting off the portion of the moldable material which has passed through the die, and control mechanism for preventing the operation of the cutting mechanism in the event that said member is moved beyond a predetermined position.

2. In a wrapping machine, in combination, a pressure chamber provided with a reciprocatory plunger, and a die in the end of the chamber through which a mass of moldable material may be forced by the plunger, cutting mechanism for operation upon the moldable material which has passed through the die, and control mechanism for preventing the operation of the cutting mechanism in the event that the plunger member has been moved to a predetermined position near the end of its stroke.

3. In a wrapping machine, in combination, a forming chamber provided with a die, and means for forcing a mass of moldable material through said die, a sliding die member capable of co-operation with the aforesaid die to receive the slab of moldable material passing through said die, a contact member cooperating with the end of the slab of moldable material when within said sliding die to be moved thereby, cutting mechanism, and means for preventing the operation of the cutting mechanism in the event that said contact member is not moved to a predetermined position.

4. In a wrapping machine, in combination, means for supporting and moving a slab of moldable material, a hollow member into which the end of said slab is moved, a contact member within the hollow member with which the end of the slab cooperates, cutting mechanism for severing the end portion of the slab, and means controlled by said contact member for controlling the operation of the cutting mechanism.

5. In a wrapping machine, in combination, means for forming a slab of moldable material from a mass thereof, means for cutting individual cakes from the end portion of said slab, and control mechanism cooperating with the cutter for preventing the operation thereof in the event of an insufficient supply of material to form the slab or in the event that the end of the slab has not been positioned in definite relation with respect to the cutter member.

6. In a machine of the character described, in combination, a pressure chamber having a die, a plunger therein for forcing the material through the die, a contact member engaged by the end of the slab projecting from the die, a cutter operative adjacent the die, and means for releasing the pressure of both the plunger and the contact member from the slab prior to the operation of the cutter.

7. In a machine of the character described, in combination, a pressure chamber having a die, a plunger therein, a cutter operative adjacent the die, and means for releasing the pressure of the plunger on the material prior to the operation of the cutter.

8. In a machine of the character described, in combination, a pressure chamber having a die, a cutter member adjacent the die, a plunger in the chamber, a movable hollow member for supporting the end of the material projecting from the die, means for moving the hollow member away from the end of the slab projecting from the die, and means for releasing the pressure of the plunger on the material prior to the operation of the cutter.

9. In a machine of the character described, in combination, a pressure chamber having a die, a plunger in the chamber, a cutter for forming cakes, a hollow support for supporting the end of the slab prior to the operation of the cutter, means for moving the hollow support from the end of the slab, and a transferring device for supporting the cake at the forming position after the operation of the cutter, and means for moving said device and the cake supported thereon as a unit.

10. In a wrapping machine, in combination, a forming chamber provided with a die, means for forcing a mass of moldable material through said die, a movable transferring and supporting member normally positioned below the slab of material extruded through the die, a movable hollow member capable of being moved over the transferring member and into a position to receive and support the end of the material projecting from the die, a cutter between the transferring member and the die for severing the cake extruded through the die while the latter is supported by the hollow supporting member, means for withdrawing the hollow supporting member from the cake thus severed, and means for operating the transferring member to support the cake at the extruding position and to bodily move the transferring member and the cake supported thereon as a unit.

11. The combination in a wrapping machine, of a pressure chamber having a die, with a plunger for extruding moldable material from the chamber, a cutter operative across the mouth of the die for cutting off a cake from the extruded moldable material, a hollow supporting member adapted to be moved into a position to receive within it and to support the extruded portion of the moldable material projecting from the die, a transferring element located below the extruded portion of the moldable material and across which the hollow supporting member extends in one position, means for operating the cutter, and means for simultaneously withdrawing the hollow supporting member from the cake formed by the cutter to automatically deposit it in the extruding position upon the transferring member, and operating mechanism for the transferring member for moving the transferring member and cake supported thereon as a unit.

12. In a machine of the character described, in combination, a pressure chamber provided with a die, means for exerting pressure on moldable material within the pressure chamber to extrude it through the die, a cutter movable across the mouth of the die, a transferring element positioned below the cake forming portion of the moldable material extruded from the die, a hollow supporting member movable across the transferring element to receive within it and support the cake forming portion, means for operating the cutter, means for withdrawing the hollow supporting member without disturbing the cake forming portion of the extruded material, and means for thereafter operating the transferring member to raise the cake thus formed into operative relation to other instrumentalities.

13. A wrapping machine, in combination, means for forming an individual cake of moldable material including a die and a cutter movable across the face of the die, means for supporting the cake prior to the operation of the cutter comprising a hollow member provided therein with a contact member relatively movable with relation thereto, a transferring element located below the cake and upon which the cake is adapted to rest when the hollow member is withdrawn upon relative movement between it and the contact member therein, and means for operating the transferring element after the cake has been formed and the supporting member has been withdrawn to bodily raise the transferring element and cake supported thereon.

14. In a machine of the character described, in combination, means for forming a slab of moldable material, a hollow cake shaping chamber provided with a movable slab engaging member of substantially the sectional dimension of the chamber and into which the end of the slab is pressed while engaging said member to thereby eliminate air pockets in the chamber and to form a cake of accurate dimensions in two directions, and a cutter for severing the end portion of the slab thus shaped to form a cake.

15. In a machine of the character described, in combination, a pressure chamber having a die, a hollow cake shaping chamber provided with a movable rear wall and open at its front, means for moving the chamber and rear wall into contact with the face of the die and for permitting the end of the slab as it is forced through the die to be pressed into the cake forming chamber, means for relatively moving the hollow chamber with relation to the rear wall for withdrawing the hollow chamber from the end of the slab, and a cutter for severing the slab to form a cake.

16. In a machine of the character described, in combination, a pressure chamber provided with a die and plunger movable therein for forcing material through the die, a supply conduit for supplying material to the pressure chamber, a knife for cutting off the supply of material from the supply conduit to the pressure chamber, means for reciprocating said plunger, means for reciprocating said knife, and means actuated upon the return movement of the knife for moving the plunger rearwardly to release pressure of the plunger on the moldable material.

17. In a machine of the character described, in combination, a pressure chamber provided with a die and plunger movable therein for forcing material through the die, a supply conduit for supplying material to the pressure chamber, a knife for cutting off the supply of material from the supply conduit to the pressure chamber, means for reciprocating said plunger, means for reciprocating said knife, connection between the knife actuating means and the plunger, including a ratchet and pawl, for moving the plunger rearwardly to release pressure of the plunger on the moldable material upon rearward movement of the knife.

18. In a machine of the character described, in combination, a pressure chamber having a die, means for forcing moldable material through the die, a cutter operative adjacent the die, and means for releasing the pressure on the moldable material prior to the operation of the cutter.

STANLEY R. HOWARD.
ARTHUR C. EVERETT.